(12) United States Patent
Sun

(10) Patent No.: US 10,782,150 B2
(45) Date of Patent: Sep. 22, 2020

(54) DIRECTION SENSOR

(71) Applicant: Chun-I Sun, New Taipei (TW)

(72) Inventor: Chun-I Sun, New Taipei (TW)

( * ) Notice: Subject to any disclaimer, the term of this patent is extended or adjusted under 35 U.S.C. 154(b) by 345 days.

(21) Appl. No.: 15/854,805

(22) Filed: Dec. 27, 2017

(65) Prior Publication Data

US 2018/0180449 A1 Jun. 28, 2018

(30) Foreign Application Priority Data

Dec. 27, 2016 (CN) .......................... 2016 1 1224344

(51) Int. Cl.
| | | |
|---|---|---|
| *G01P 13/00* | (2006.01) | |
| *G01D 5/14* | (2006.01) | |
| *G01C 21/10* | (2006.01) | |
| *G01C 9/00* | (2006.01) | |

(52) U.S. Cl.
CPC .................. *G01D 5/14* (2013.01); *G01C 9/00* (2013.01); *G01C 21/10* (2013.01); *G01P 13/00* (2013.01)

(58) Field of Classification Search
CPC . G01D 5/14; G01D 5/16; G01C 21/10; G01C 21/20; G01C 9/00; G01P 13/00; G01P 13/02
USPC .................. 73/865.8, 178 R, 382 R; 33/283, 33/300–315, 333, 334, 365–366.14, 368, 33/369, 391, 395; 324/691, 722, 724, 324/71.1

See application file for complete search history.

(56) References Cited

U.S. PATENT DOCUMENTS

| | | | | |
|---|---|---|---|---|
| 4,846,195 A | * | 7/1989 | Alt .................... | A61N 1/36542 600/595 |
| 5,610,338 A | * | 3/1997 | Kato .................. | G01P 13/00 200/61.45 R |
| 6,518,523 B1 | | 2/2003 | Chou | |
| 7,176,396 B1 | | 2/2007 | Chou | |
| 2009/0266168 A1 | * | 10/2009 | Shimase .............. | G01C 9/10 73/649 |

FOREIGN PATENT DOCUMENTS

CN 101236859 B 5/2010

* cited by examiner

*Primary Examiner* — Robert R Raevis
(74) *Attorney, Agent, or Firm* — JCIPRNET

(57) ABSTRACT

A direction sensor includes two electrode guides, at least six contact pins, a moving member and a signal processing circuit. The two electrode guides are formed with a gap. The two electrode guides and the at least six contact pins define a space. The moving member is restricted to move in the space. The two electrode guides are electrically connected to one signal terminal of the signal processing circuit, respectively, and the at least six contact pins are electrically connected to another signal terminal of the signal processing circuit, respectively. A direction is sensed after the moving member moves in the space according to a sensed direction and contacts with the contact pin corresponding to the sensed direction below, so that one of the electrode guides and the contact pin corresponding to the sensed direction below form a sensing signal loop through the moving member.

10 Claims, 14 Drawing Sheets

DIRECTION SENSOR

RELATED APPLICATIONS

This application claims priority to China Application Serial Number 201611224344.6, filed Dec. 27, 2016, which is herein incorporated by reference.

BACKGROUND

Technical Field

The present disclosure relates to a sensor. More particularly, the present disclosure relates to a direction sensor.

Description of Related Art

With the development of science and technology, many equipment or devices can obtain information from outside world. If these equipment or devices want to obtain the information from the outside world, they need to rely on sensors. The sensors (also known as transducers), detection devices, can detect measured information, and can transform the measured information into electrical signals or other required form of signal outputs for satisfying requirements of information transmission, information processing, information storage, information display, information recording and information control.

There are many types of the sensors, such as temperature sensors, humidity sensors, displacement sensors, pressure sensors and liquid level sensors. However, conventional direction sensors can only sense three to four flip directions of the sensed objects. There is no sensor with simple structure which can accurately sense six directions of the sensed object and minimize a structure of the conventional sensor as much as possible. In addition, there is no sensor having a different structure from the conventional sensor, wherein the different structure can change use patterns of the sensor from old methods, and increase application scopes of the sensor. For example, the sensor includes two electrode guides, at least six contact pins, a moving member and a signal processing circuit as an overall structure in the actual state of use is provided. When a direction is sensed, the electrode guide corresponding to the sensed direction below guides the moving member to a moving direction according to a sensed direction, and the moving member contacts with the contact pin corresponding to the sensed direction below, so that one of the electrode guides and the contact pin corresponding to the sensed direction below form a sensing signal loop through the moving member. The signal processing circuit receives the flip direction of the sensed object according to the sensing signal, wherein six directions of the sensed object can be sensed. The structure of the present disclosure can reduce material costs and complex manufacturing processes by omitting use of piezoelectric sensors, and all of which are not specifically shown or disclosed in the prior art.

SUMMARY

According to one aspect of the present disclosure, a direction sensor is provided. The direction sensor includes two electrode guides, at least six contact pins, a moving member and a signal processing circuit. The two electrode guides are formed with a gap. The two electrode guides and the at least six contact pins define a space. The moving member is restricted to move in the space. The two electrode guides are electrically connected to one signal terminal of the signal processing circuit, respectively, and the at least six contact pins are electrically connected to another signal terminal of the signal processing circuit, respectively. A direction is sensed after the moving member moves in the space according to a sensed direction and contacts with the contact pin corresponding to the sensed direction below, so that one of the electrode guides and the contact pin corresponding to the sensed direction below form a sensing signal loop through the moving member.

BRIEF DESCRIPTION OF THE DRAWINGS

The present disclosure can be more fully understood by reading the following detailed description of the embodiment, with reference made to the accompanying drawings as follows.

DETAILED DESCRIPTION

Figure 1:
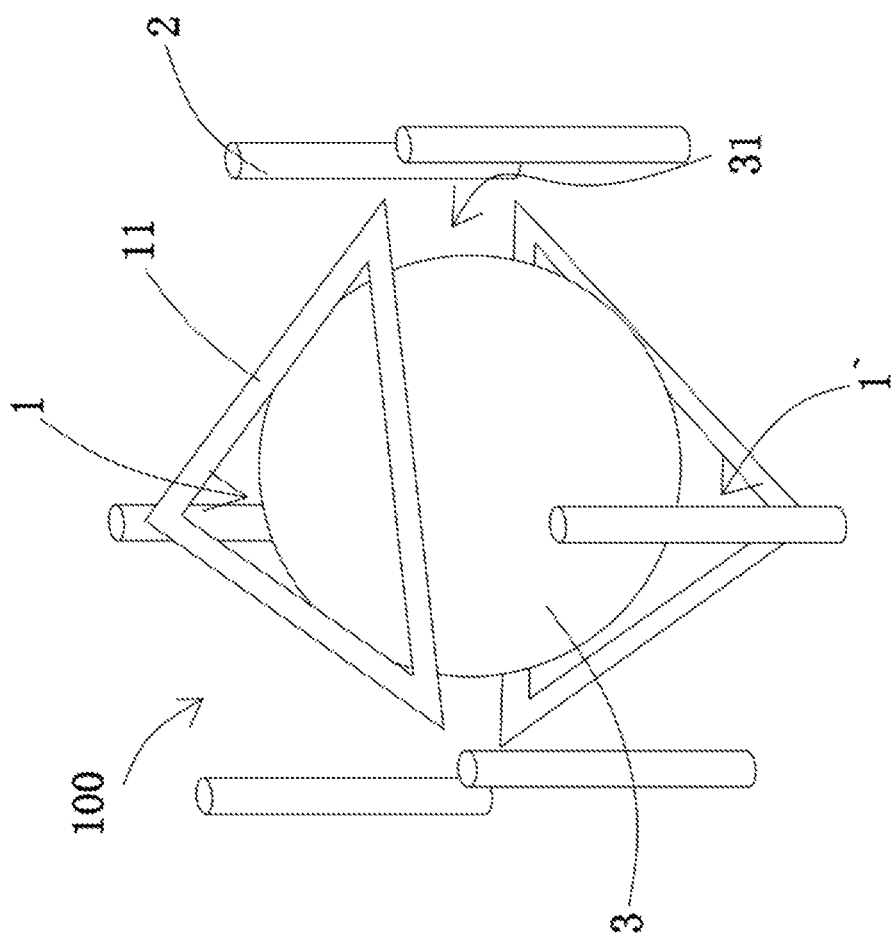
FIG. 1 is a three-dimensional view according to first embodiment of the present disclosure.

Unless contraindicated or noted otherwise, in these descriptions and throughout this specification, a directional relationship of terms "above", "below", "front", "back", "left" and "right" represent the directional relationship shown in the drawings. The directional relationship are merely for the convenience of describing the present disclosure and for simplifying the description, rather than indicating or implying that the devices or components referred to must have a particular direction, and be constructed and operated in a particular direction. Therefore, it can not be interpreted as a limitation of the present disclosure. In addition, the terms "first" and "second" are only used for descriptive purposes and it can not be understood as indicating or implying relative importance.

Unless contraindicated or noted otherwise, in these descriptions and throughout this specification, the terms "install" and "connect" should be interpreted broadly. For example, they can mean a fixed connection, a detachable connection, an integrated connection, a mechanical connection, an electrical connection, a direct connection, an indirect connection through an intermediate medium, or an internal connection of two components. For a person skilled in the relevant field of technology, the specific meanings of the above terms in the present disclosure can be understood in detail.

FIG. 1 is a three-dimensional view of a direction sensor 100 according to first embodiment of the present disclosure. The direction sensor 100 includes two electrode guides 1, 1', at least six contact pins 2, a moving member 3 and a signal processing circuit (not shown). The two electrode guides 1, 1' are formed with a gap (not shown). The two electrode guides 1, 1' and the at least six contact pins 2 define a space 31. The moving member 3 is restricted to move in the space 31. The two electrode guides 1, 1' are electrically connected to one signal terminal of the signal processing circuit, respectively, and the at least six contact pins 2 are electrically connected to another signal terminal of the signal processing circuit, respectively. When a direction is sensed, the moving member 3 moves in the space 31 according to a sensed direction, and contacts with the contact pin 2 corresponding to the sensed direction below, so that one of the electrode guides 1, 1' and the contact pin 2 corresponding to the sensed direction below form a sensing signal loop through the moving member 3. That is, the moving member 3 contacts with the contact pin 2 corresponding to the sensed direction below.

In this embodiment, the electrode guides 1, 1' can be disposed inclined. That is, the two electrode guides 1, 1' are inclined to the horizontal a predetermined angle, wherein a range of the predetermined angle is greater than 0 degree and less than 90 degrees. The at least six contact pins 2 corresponds to six sensed directions. That is to say, each of the sensed direction corresponds to at least one contact pin 2. It should be noted that the six sensed directions are the six flip directions of the sensed object, such as front, back, above, below, left and right. That is, the at least six contact pins 2 correspond to six stereo flip sensed directions. Moreover, the direction sensor 100 can sense the six flip directions of the sensed object no matter what shape the sensed object is. When the sensed object is not flipped, the direction sensor 100 does not sense the direction regardless of whether a center of gravity of the sensed object changes. Only when the sensed object is flipped, the direction sensor 100 senses the flip direction of the sensed object.

Figure 2:
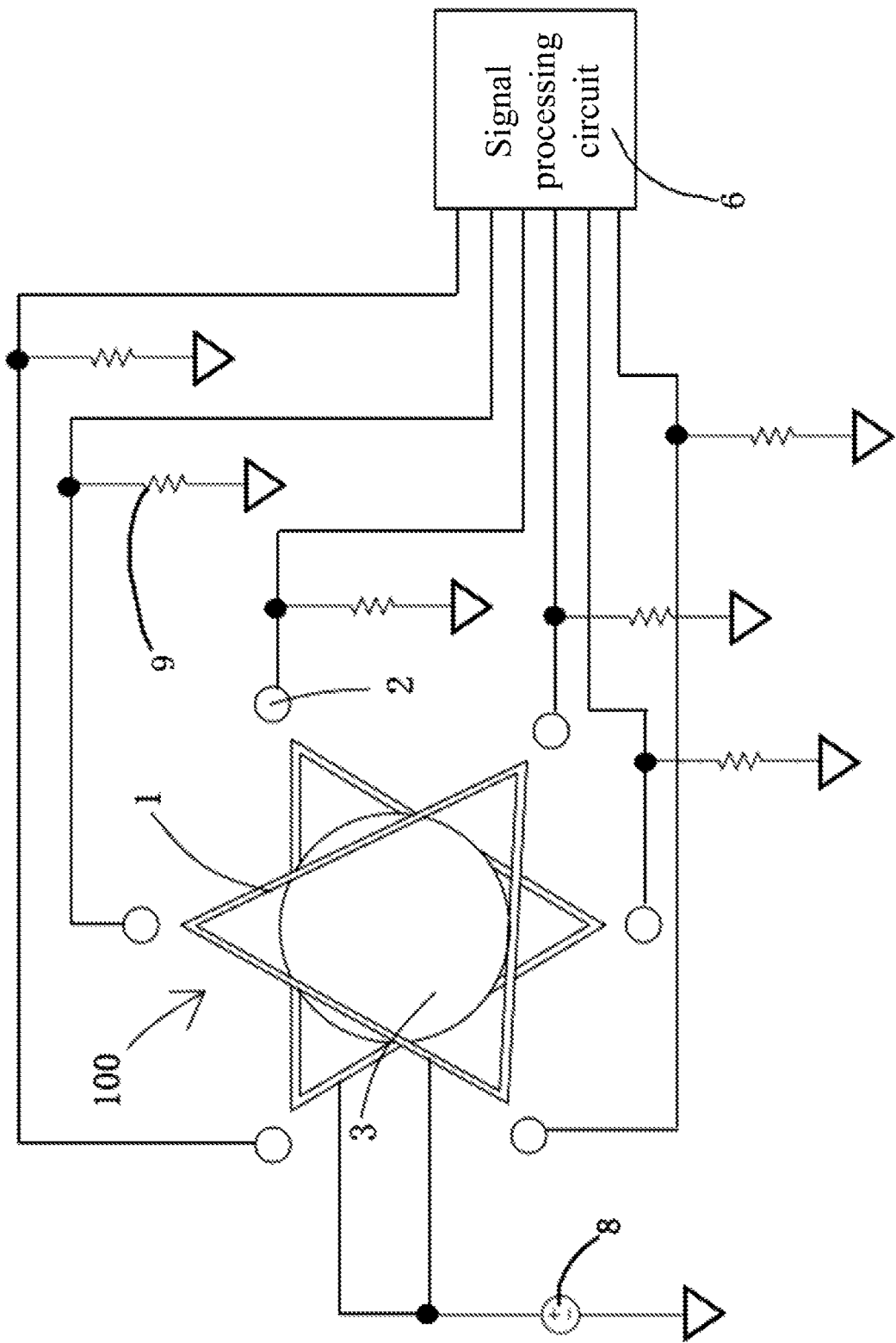
FIG. 2 is a structural view of the first embodiment further including a signal processing circuit of FIG. 1.

In this embodiment, a number of the contact pins 2 can be six, wherein each sensed direction can correspond to one contact pin 2. The at least six contact pins 2 can be arranged in an annular shape. In particular, the at least six contact pins 2 can be arranged in a hexagon (as shown in FIG. 2), more preferably arranged in a regular hexagon.

In this embodiment, the two electrode guides 1, 1' can be oppositely disposed and formed with a gap. The at least six contact pins 2 can be annularly arranged to form an annular space. A distance between two adjacent contact pins 2 is less than a minimum diameter of the moving member 3, so that it can prevent the moving member 3 from slipping from an interval between the two adjacent contact pins 2. The two electrode guides 1, 1' and the at least six contact pins 2 define the space 31. That is to say, the space 31 is formed by the gap and the annular space.

In this embodiment, the at least six contact pins 2 can not contact with the two electrode guides 1, 1', and the at least six contact pins 2 can be away from the two electrode guides 1, 1'. That is, the at least six contact pins 2 and the two electrode guides 1, 1' can be separated by a certain distance, and the at least six contact pins 2 can be suspended. A length of the at least six contact pins 2 can be greater than, equal to or less than a width of the gap, wherein the width of the gap is a distance between the two electrode guides 1, 1'. It should be noted that the at least six contact pins 2 can be disposed between the two electrode guides 1, 1'. That is, the length of the at least six contact pins 2 is less than the width of the gap, so that the length of the at least six contact pins 2 can ensure that the moving member 3 does not slip from the space 31 and the moving member 3 can contact any one of the at least six contact pins 2.

In this embodiment, the contact pins 2 can be substantially perpendicular (90 degrees) to the planes where the two electrode guides 1, 1' are located. The at least six contact pins 2 can be made of a conductive material, or the at least six contact pins 2 can be made of an insulated material. When the at least six contact pins 2 are made of the insulated material, surfaces of the at least six contact pins 2 need to coat with a conductor layer. The common conductive material can be aluminum, copper, iron, alloy, etc. The conductive material used in the present disclosure is not limited to aforementioned examples, and other examples will not be described here in detail. The person skilled in the relevant field of technology can choose an appropriate conductive material according to actual needs.

In this embodiment, the width of the gap can be greater than a maximum diameter of the moving member 3. The moving member 3 can be substantially spherical, such as round spherical or ellipsoidal, and the width of the gap is greater than the maximum diameter of the sphere. A shape of the moving member 3 is not limited to spherical, and the shape of the moving member 3 can be other shapes as long as the moving member 3 can move in the space 31 and contact with the contact pin 2 corresponding to the sensed direction below. But other examples will not be described here.

In this embodiment, the moving member 3 can be made of the conductive material, or the moving member 3 can be made of the insulated material. When the moving member 3 is made of the insulated material, a surface of the moving member 3 needs to coat with the conductor layer. The common conductive material can be aluminum, copper, iron, alloy, etc. The conductive material used in the present disclosure is not limited to aforementioned examples, and other examples will not be described here in detail. The person skilled in the relevant field of technology can choose the appropriate conductive material according to actual needs.

In this embodiment, the two electrode guides 1, 1' can be two frames, and cross-sectional shapes of the two electrode guides 1, 1' can be triangles. In other words, the frames are triangular, and the two electrode guides 1, 1' are two triangular frames. In detail, the frames can be equilateral triangles or other triangles (not shown). The two triangles rotate relative to each other by a predetermined angle. In this embodiment, the predetermined angle can be 180 degrees. That is, the two triangles rotate 180 degrees relative to each other, and the at least six contact pins 2 are disposed arranged in the regular hexagon. Furthermore, a range of the predetermined angle that the two triangles rotated relative to each other is greater than or equal to 150 degrees and less than or equal to 210 degrees (not shown).

In this embodiment, a diameter of an incircle of the two electrode guides 1, 1' can be smaller than the minimum diameter of the moving member 3. In other words, the diameter of the incircle of the triangle is smaller than the minimum diameter of the sphere, so that it can effectively prevent the sphere from slipping from the triangles, that is, it can prevent the moving member 3 from slipping from the two electrode guides 1, 1'.

In this embodiment, the two electrode guides 1, 1' can be made of the conductive material, respectively, or the two electrode guides 1, 1' can be made of the insulated material, respectively. When the two electrode guides 1, 1' are made of the insulated material, surfaces of the two electrode guides 1, 1' need to coat with the conductor layer. The common conductive material can be aluminum, copper, iron, alloy, etc. The conductive material used in the present disclosure is not limited to aforementioned examples, and other examples will not be described here in detail. The person skilled in the relevant field of technology can choose the appropriate conductive material according to actual needs.

In this embodiment, the moving member 3 can move in the space 31, wherein a force that moves the moving member 3 is gravity. When the sensed object is deflected, the moving member 3 moves to the contact pin 2 corresponding to the sensed direction below by a gravity action. During the movement, the moving member 3 moves (rolls) along one of the electrode guides 1, 1' or the contact pins 2 corresponding to other sensed directions to the contact pin 2 corresponding to the sensed direction below, so that the moving member 3 contacts with the contact pin 2 corresponding to the sensed direction below.

There are two functions of the electrode guides 1, 1' in the present disclosure. One function of the electrode guides 1, 1' is for guiding. When the direction is sensed, the moving member 3 moves toward the contact pin 2 along a guide of one of the two electrode guides 1, 1' by the gravity action, wherein the contact pin 2 corresponds to the sensed direction below. Therefore, the moving member 3 contacts with the contact pin 2 corresponding to the sensed direction below. The two electrode guides 1, 1' mainly guide a movement direction of the moving member 3. That is, the two electrode guides 1, 1' like tracks. When the direction is sensed, the moving member 3 can move in a correct track and contact with the correct contact pin 2.

The other function of the electrode guides 1, 1' are used as electrodes. At least one of the two electrode guides 1, 1' contacts with the moving member 3 regardless of whether the moving member 3 moves or not. The two electrode guides 1, 1' are electrically connected to one signal terminal of the signal processing circuit, respectively.

In this embodiment, positions of the at least six contact pins 2 can correspond to corners of the triangles, and the moving member 3 can move in the space 31 along the triangle. The advance of this design is that it is convenient to guide the moving member 3 to contact with the contact pin 2 corresponding to the sensed direction below when the direction is sensed.

In this embodiment, the two electrode guides 1, 1' can be electrically connected to a signal output terminal of the signal processing circuit, respectively, and the at least six contact pins 2 can be electrically connected to a signal input terminal of the signal processing circuit, respectively. The two electrode guides 1, 1' also can be electrically connected to the signal input terminal of the signal processing circuit, respectively, and the at least six contact pins 2 also can be electrically connected to the signal output terminal of the signal processing circuit, respectively. A specific structure of the signal processing circuit, please refer to FIG. 2 and its related contents.

The working principle of the present disclosure is described as follows. The direction sensor 100 is obliquely disposed on a surface of the sensed object or in an interior of the sensed object before flipping. If the electrode guide 1' is located below, the electrode guide 1 is located above. The contact pin 2 corresponding to the sensed direction above the sensed object is located below, and the contact pin 2 corresponding to the sensed direction below the sensed object is located above. The moving member 3 contacts with the contact pin 2 located below, and the moving member 3 is also contacts with the electrode guide 1' located below. Accordingly, the contact pin 2 located below, the moving member 3 and the electrode guide 1' form the sensing signal loop, and the direction sensed by the direction sensor 100 is above the sensed object before flipping.

After flipping, it is assumed that the sensed object is flipped by 180 degrees, that is, the sensed direction above before the sensed object is flipped convert into the sensed direction below after the sensed object is flipped, and the sensed direction below before the sensed object is flipped convert into the sensed direction above after the sensed object is flipped. Accordingly, the electrode guide 1' is located above and the electrode guide 1 is located below. Since the sensed direction below before the sensed object is flipped convert into the sensed direction above after the sensed object is flipped, the contact pin 2 corresponding to the sensed direction below the sensed object is located below, and the contact pin 2 corresponding to the sensed direction above the sensed object is located above. The moving member 3 contacts with the contact pin 2 located below, and the moving member 3 contacts with the electrode guide 1 located below. Accordingly, the contact pin 2, the moving member 3 and the electrode guide 1 form the sensing signal loop, and the direction sensed by the direction sensor 100 is below the sensed object before flipping. By analogy, the detection of other sensed directions of the sensed object will not be described here.

In the flip process, the moving member 3 comes into contact with the electrode guide 1 from contact with the electrode guide 1', and the contact pin 2 located below before flipping is turned over and then located above. Under the gravity action, the moving member 3 is detached from the contact pin 2 located above and moves along the guiding of the electrode guide 1 toward the contact pin 2 located below after flipping till the moving member 3 contacts with the contact pin 2 located below. During the guiding of the electrode guide 1, the electrode guide 1 only guides the moving member 3 contacts with the contact pin 2 located below, rather than guides the moving member 3 contacts with the contact pin 2 located in other positions (directions).

In the present disclosure, it needs to emphasize that when the direction sensor 100 is used for sensing direction, the sensed direction sensed by the direction sensor 100 is always at the top, and then the contact pin 2 corresponding to the sensed direction must be located below. That is, the sensed direction of the sensed object can be sensed by the direction sensor 100 only when the sensed direction is located above, and the contact pin 2 corresponding to the sensed direction must be located below. Regardless of how the sensed object is flipped, the contact pin 2 located below must correspond to the sensed direction above of the sensed object after flipping. One of the two electrode guides 1, 1' guides the moving member 3 toward the contact pin 2 located below, so that the moving member 3 contacts with the contact pin 2 located below.

In the present disclosure, the contact pins 2 can be substantially perpendicular (90 degrees) to the planes where the two electrode guides 1, 1' are located. The contact pins 2 also can be at the predetermined angle with the planes where the two electrode guides 1, 1' are located, wherein the range of the predetermined angle can be greater than or equal to 0 degree and less than or equal to 90 degrees.

In the present disclosure, the number of the contact pins 2 is not limited to six. The number of the contact pins 2 can be seven, eight, nine, etc., but other examples will not be described here in detail. As long as the number of the contact pins 2 is at least six, and it falls within the protection scope of the present disclosure. In other embodiments of the present disclosure, the number of the contact pins 2 is also six. In other words, the present disclosure will describe a plurality of embodiments of the direction sensor 100 having the six contact pins 2.

In the present disclosure, the contact pins 2 corresponding to one sensed direction can be replaced by a restricting member (not shown), and the restricting member is not electrically connected to the signal processing circuit. In other words, the remaining contact pins 2 are electrically connected to the signal processing circuit, respectively, and the restricting member is not electrically connected to the signal processing circuit.

For instance, the number of the contact pins 2 is six. That is, the six contact pins 2 become five contact pins 2 and one the restricting member, wherein one of the contact pin 2 is replaced by the restricting member. The five contact pins 2 are electrically connected with the signal processing circuit, respectively, and the restricting member is not electrically connected with the signal processing circuit. When the direction is sensed, the moving part 3 contacts with the restricting member corresponding to the sensed direction below, the signal processing circuit can not detect the sensing signal, so that the signal processing circuit will accurately detect the direction corresponding to the restricting member sensed. That is, when the direction sensor 100 senses the direction corresponding to the restricting member, the signal processing circuit can not detect the sensing signal, and only when the direction sensor senses the direction corresponding to one of the contact pin 2 of the five contact pins 2, the sensing signal can be detected.

The restricting member can be made of the conductive material, or the restricting member can be made of the insulated material. The shape of the restricting member can be a rod, a sheet or other shape. No matter what kind of material the restricting member is made of and no matter what shape it is, the restricting member corresponds to one of the sensed directions, and the restricting member is not electrically connected with the signal processing circuit. The remaining five contact pins 2 are electrically connected with the signal processing circuit, respectively, and it also can still achieve the purpose of sensing six directions. In the present disclosure, when the number of the contact pins 2 is more than six (not shown), at least two contact pins 2 correspond to at least one sensed direction, that is, at least two contact pins 2 are used to sense same sensed direction. For example, when the number of the contact pins 2 is seven, it means that one of the sensed directions corresponds to two contact pins 2. The advantage of having more than six contact pins 2 is that at least two contact pins 2 correspond to one sensed direction. Even if one of the contact pins 2 is damaged and cannot work normally, the other contact pin 2 can still work normally. Accordingly, it will not affect the normal operation of the direction sensor 100. It should be noted that, the person skilled in the relevant field of technology can make corresponding changes according to this embodiment to obtain information about how to arrange the contact pins 2 whose number is greater than six. Therefore, how to arrange the contact pins 2 whose number is greater than six will not be described here.

In the present disclosure, an annular arrangement of the at least six contact pins 2 also can be arranged as a circle, a heptagon, an octagon, a nonagon, etc. except the hexagon. That is, the annular arrangement of the at least six contact pins 2 is not limited to the hexagon and can be arranged to other shapes depending on the number of the contact pins 2. Regardless of the shape of annular arrangement of the at least six contact pins 2, the annular arrangement should ensure that each of the sensed direction correspond to at least one contact pin 2, and the moving member 3 can move in the space 31 and can contact the at least one contact pin 2 corresponding to each sensed direction.

In the present disclosure, the two electrode guides 1, 1' can be two frames, and structures of the two electrode guides 1, 1' can be modified according to actual needs. That is, the two electrode guides 1, 1' can be recesses, through holes, the frames or a combination of any two.

In the present disclosure, the cross-sectional shapes of the two electrode guides 1, 1' can be geometric shapes or irregular geometric shapes. The geometric shapes can be circles, ellipses, triangles, pentagons, hexagons or heptagons. In summary, the electrode guides 1, 1' can be the recesses with geometric cross sections or irregular geometric cross sections. The electrode guides 1, 1' also can be the through holes with geometric cross sections or irregular geometric cross sections. Otherwise, the electrode guides 1, 1' can be the frames with geometric cross sections or irregular geometric cross sections.

In the present disclosure, one of the two electrode guides 1, 1' will guide the moving member 3 to the contact pin 2 located below regardless of how the sensed object is flipped. Therefore, the moving member 3 will contact with the contact pin 2 located below rather than the contact pin 2 located in other positions (directions).

In the present disclosure, the diameter of the incircle of the two electrode guides 1, 1' is smaller than the minimum diameter of the moving member 3. This structure is mainly for the embodiments that the two electrode guides 1, 1' are the through holes or the frames except the recesses. When the two electrode guides 1, 1' are the through holes or the frames, it is possible that the moving member 3 slips from the interval of the two electrode guides 1, 1'.

In the present disclosure, "the contact pin 2 corresponding to the sensed direction below" means the lowest contact pin 2 of the at least six contact pins 2 when the direction sensor 100 is disposed obliquely. That is, it means the contact pin 2 with the lowest horizontal position (please refer to FIG. 13).

Please refer to FIG. 2. FIG. 2 is a top view of the first embodiment further including the signal processing circuit of FIG. 1. In FIG. 2, the working principle and structure of the direction sensor 100 are the same as that shown in the direction sensor 100 of FIG. 1, the details please refer to FIG. 1 and the description of FIG. 1, and thus it is not illustrated any further. The details of the signal processing circuit 6 are as follows. In this embodiment, the direction sensor 100 can further include a power supply 8 and at least six resistances 9. The two electrode guides 1, 1' are electrically connected to the power supply 8, respectively, the at least six contact pins 2 are connected to ground through the at least six resistances 9, respectively, and the at least six contact pins 2 can be further electrically connected to the signal input terminal of the signal processing circuit 6.

In this embodiment, the resistances 9 connected to the ground are for providing a normal low electric potential state to each signal input terminal of the signal processing circuit 6. When the moving member 3 contacts with the contact pin 2 corresponding to one of the sensed directions and one of the two electrode guides 1, 1', the signal input terminal of the signal processing circuit 6 corresponding to the contact pin 2 will be changed to a high electric potential.

The present disclosure is not limited to the above connection method, and the connection of the direction sensor 100 can be reversed as follows. The two electrode guides 1, 1' can be electrically connected to a low electric potential (or a ground potential), and the resistances 9 electrically connected to the at least six contact pins 2 can be connected to the high electric potential for providing a normal high electric potential state to each signal input terminal of the signal processing circuit 6. When the moving member 3 contacts with the contact pin 2 corresponding to one of the sensed directions and one of the two electrode guides 1, 1', the signal input terminal of the signal processing circuit 6 corresponding to the contact pin 2 will be changed to the low electric potential (or the ground potential). However, in the present disclosure, the signal processing circuit 6 is not limited to the above configuration and can be other configurations. The signal processing circuit 6 can be a circuit without a microcontroller unit (MCU), or can be the circuit with the MCU.

In the present disclosure, when the signal processing circuit 6 is the circuit without the MCU, the signal processing circuit 6 can further dispose an LED lamp for determining the sensed direction according to a switch status or a color of emitted light of the LED lamp. That is, when the moving member 3 contacts with the contact pin 2 corresponding to one of the sensed direction below, the LED lamp corresponding to the sensed direction will emit light or emit light with a corresponding color. In particular, when the moving member 3 contacts with the contact pin 2 corresponding to one of the sensed direction below and the one of the electrode guides 1, 1', the LED lamp corresponding to the sensed direction will emit light and the LED lamp corresponding to other sensed directions will not emit light (turn off). Or, the LED lamp corresponding to the sensed direction will emit different color of light, and people can immediately determine the sensed direction sensed by the direction sensor 100 according to the color of emitted light.

In the present disclosure, when the signal processing circuit 6 is a circuit with the MCU, the two electrode guides 1, 1' or the at least six contact pins 2 are electrically connected to the signal input terminal of the MCU, respectively.

In the present disclosure, the signal processing circuit 6 can sense the direction by two methods. The first method as shown FIG. 2, when one of the two electrode guides 1, 1' contacts with any one of the at least six contact pins 2 through the moving member 3 and forms the sensing signal loop, so that the corresponding contact pin 2 has a signal output. That is, the signal processing circuit 6 can sense the direction as long as one contact pin 2 of the at least six contact pins 2 has the signal output.

In the second method, the signal processing circuit 6 replaces the power supply position (not shown), and in each of the at least six contact pins 2, wherein each of the contact pins 2 is connected to a different voltage. That is to say, the voltage of the contact pin 2 corresponding to different sensed directions is different. For example, the contact pin 2 corresponding to the first sensed direction is connected to the voltage of 1V, the contact pin 2 corresponding to the second sensed direction is connected to the voltage of 2V, and so on, and the contact pin 2 corresponding to the sixth sensed direction is connected to the voltage of 6V. When one of the contact pins 2 is in contact with the moving member 3, a corresponding voltage is outputted at the electrode guides 1, 1'. Therefore, the signal processing circuit 6 can determine which one of the contact pins 2 is contacted according to a value of a detected voltage, thereby further determining the sensed direction.

Figure 3:
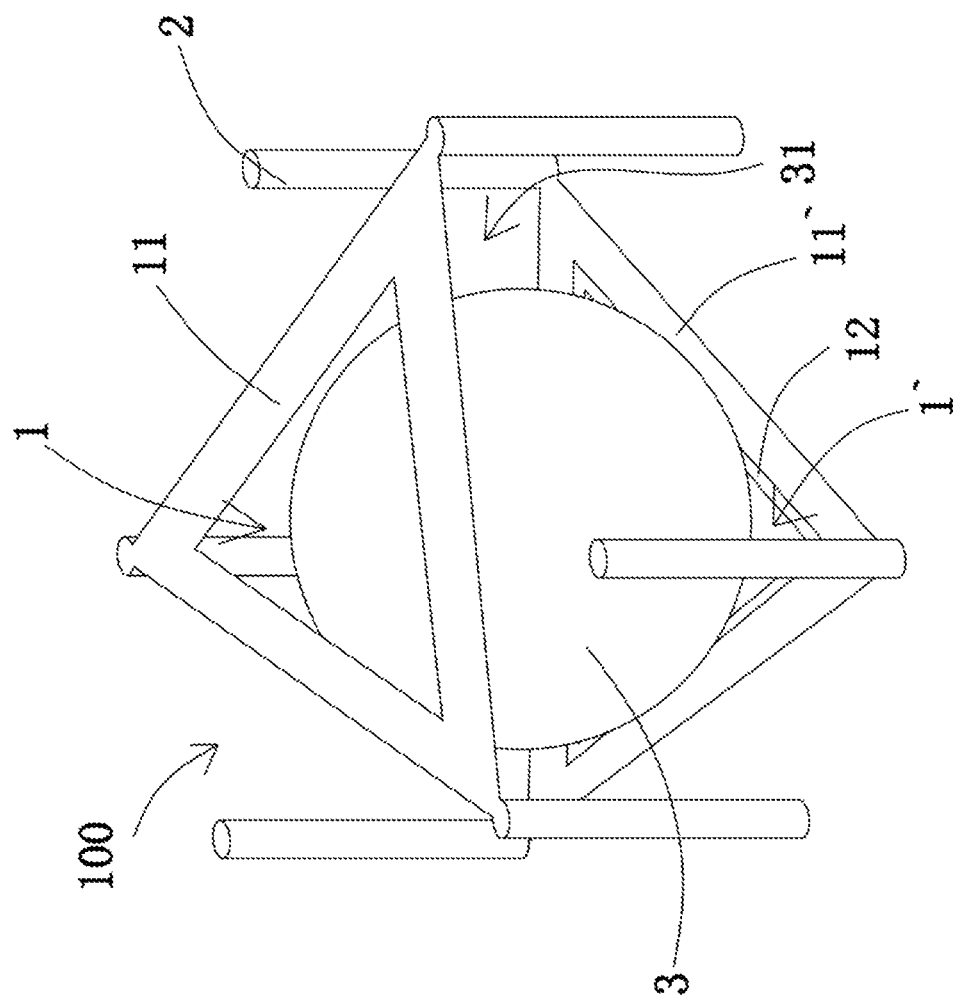
FIG. 3 is a three-dimensional view of one exemplary embodiment of the first embodiment of FIG. 1.

Please refer to FIG. 3, FIG. 3 is a three-dimensional view of one exemplary embodiment of the first embodiment of FIG. 1. The working principle of the embodiment of FIG. 3 is same as that shown in the embodiment of FIG. 1 except that the structure is partially different. Therefore, the same or corresponding components are represented as the same or corresponding reference numerals. The details please refer to FIG. 1 and the description of FIG. 1, and the same structures and principles are not illustrated any further here. The differences of the structure are as follows. In this exemplary embodiment, the direction sensor 100 can further include two position limiting structures 11, 11', wherein the two electrode guides 1, 1' are disposed on the two position limiting structures 11, 11', respectively, and the at least six contact pins 2 are connected to the two position limiting structures 11, 11', respectively.

The two position limiting structures 11, 11' can be printed-circuit boards (PCBs), wherein at least one surface thereof is a planar fixing structure, a substrate, a fixing plate structure, or a combination of any two. Among the at least six contact pins 2, one end of parts of the contact pins 2 are connected to the two position limiting structure 11, and the other end of parts of the contact pins 2 are free ends which are extend to the direction close to the position limiting structure 11'. The remaining parts of the contact pin 2 are connected to the position limiting structure 11', and the other end of parts of the contact pins 2 are free ends which are extend to the direction close to the position limiting structure 11. The adjacent two contact pins 2 are connected to different position limiting structures 11, 11', respectively. That is, the two adjacent contact pins 2 are not connected to the same position limiting structures 11, 11'.

In this exemplary embodiment, the at least six contact pins 2 can be disposed between the planes where the two electrode guides 1, 1' are located, and the length of the at least six contact pins 2 is less than the width of the gap. Shapes of the two position limiting structures 11, 11' can be triangles. However, the shapes of the two position limiting structures 11, 11' can be other shapes, such as the geometric shapes or the irregular geometric shapes and are not limited to triangles. Other examples will not be described here in detail.

In this exemplary embodiment, the two electrode guides 1, 1' can be two triangular through holes, and two triangular metal electrodes 12 are disposed on the surfaces close to the two triangular through holes, respectively. The two metal electrodes 12 are located on the opposite surfaces of the two position limiting structures 11, 11', respectively, and/or the two triangular metal electrodes 12 are directly disposed in the two triangular through holes, respectively. The arrangement of the two triangular through holes is the same as that of the two triangular frames of FIG. 1 and will not be repeated here. For details, please refer to the explanation above.

Figure 4:
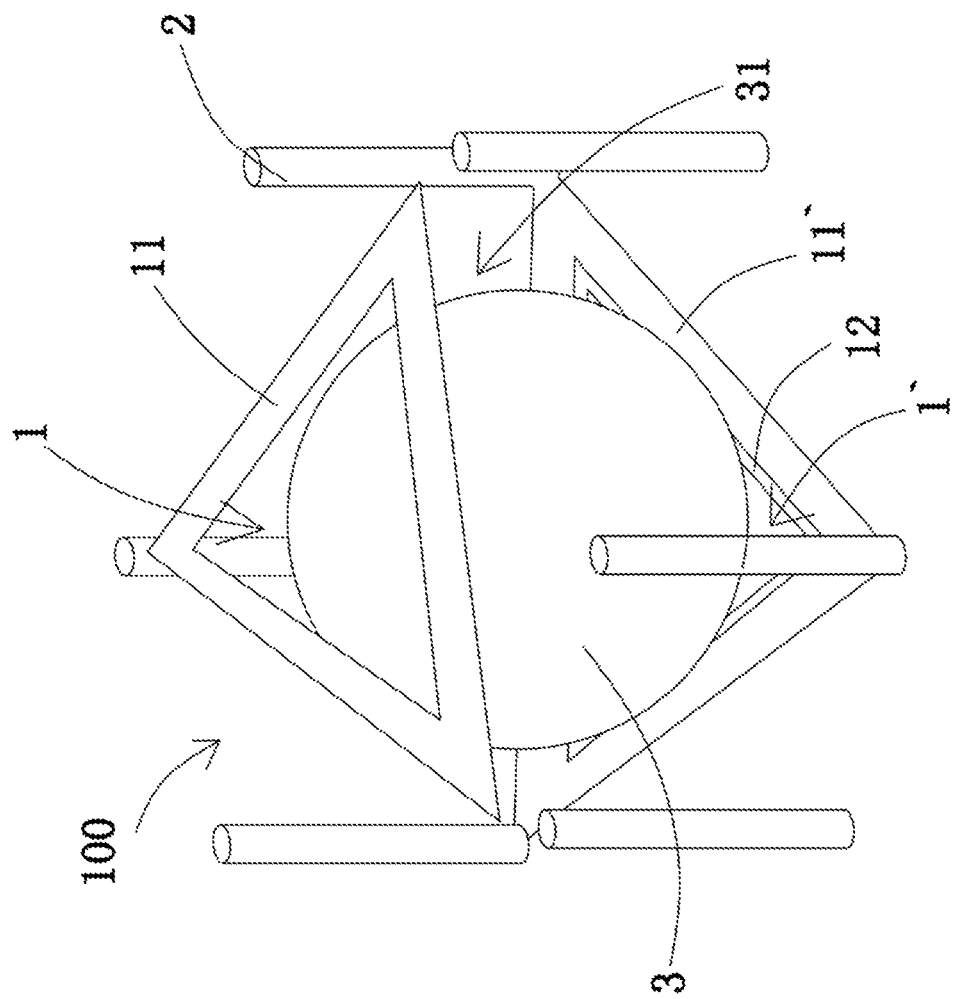
FIG. 4 is a three-dimensional view of another exemplary embodiment of the first embodiment of FIG. 1.

Please refer to FIG. 4, FIG. 4 is a three-dimensional view of another exemplary embodiment of the first embodiment of FIG. 1. The working principle of the embodiment of FIG. 4 is same as that shown in the embodiment of FIG. 3 except that the structure is partially different. Therefore, the same or corresponding components are represented as the same or corresponding reference numerals. The details please refer to the explanation above, and the same structures and principles are not illustrated any further here. The differences of the structure are as follows. In this exemplary embodiment, the direction sensor 100 can include the two position limiting structures 11, 11', wherein the two electrode guides 1, 1' are disposed on the two position limiting structures 11, 11', respectively. Parts of the at least six contact pins 2 are connected to the position limiting structures 11', and the remaining parts of the at least six contact pins 2 are not connected to the position limiting structures 11.

In the present disclosure, all of the at least six contact pins 2 can also be connected to the position limiting structure 11' or the position limiting structure 11. When there is only one position limiting structure, one of the two electrode guides 1, 1' is disposed on the position limiting structure. In other words, the other electrode guide is not disposed on the position limiting structure.

Figure 5:
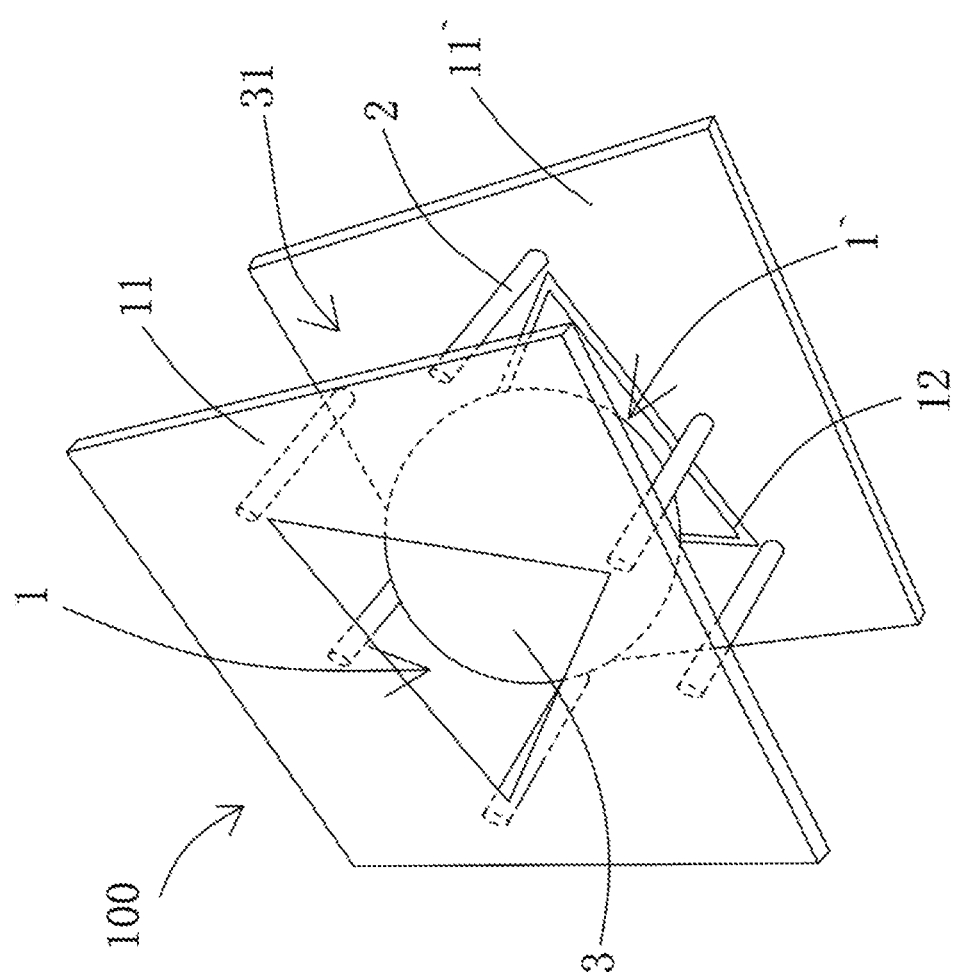
FIG. 5 is a three-dimensional view of third exemplary embodiment of the first embodiment of FIG. 1.

Please refer to FIG. 5, FIG. 5 is a three-dimensional view of third exemplary embodiment of the first embodiment of FIG. 1. The working principle of the embodiment of FIG. 5 is same as that shown in the embodiment of FIG. 3 except that the structure is partially different. Therefore, the same or corresponding components are represented as the same or corresponding reference numerals. The details please refer to the explanation above, and the same structures and principles are not illustrated any further here. The differences of the structure are as follows. In this exemplary embodiment, the shapes of the two position limiting structure 11, 11' can be quadrilaterals. The at least six contact pins 2 are disposed between the planes where the two electrode guides 1, 1' are located, and the length of the at least six contact pins 2 is smaller than the width of the gap.

Figure 6:
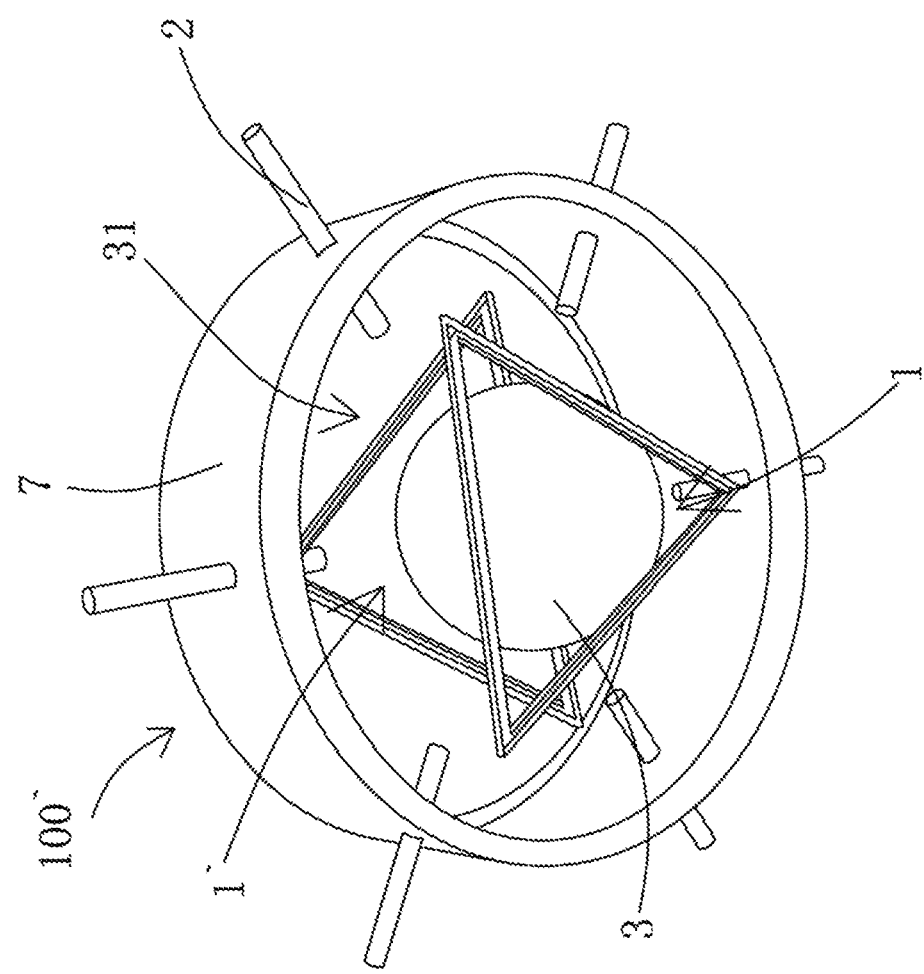
FIG. 6 is a three-dimensional view of fourth exemplary embodiment of the first embodiment of FIG. 1.

Please refer to FIG. 6, FIG. 6 is a three-dimensional view of fourth exemplary embodiment of the first embodiment of FIG. 1. The working principle of the embodiment of FIG. 6 is same as that shown in the embodiment of FIG. 1 except that the structure is partially different. Therefore, the same or corresponding components are represented as the same or corresponding reference numerals. The details please refer to the explanation above, and the same structures and principles are not illustrated any further here. The differences of the structure are as follows. In this exemplary embodiment, the direction sensor 100 can further include an annular fixing member 7, and the two electrode guides 1, 1' and the moving member 3 are disposed inside the annular fixing member 7.

In this exemplary embodiment, the at least six contact pins 2 can be fixed on the annular fixing member 7. In particular, the at least six contact pins 2 can be evenly disposed on the annular fixing member 7, that is, the at least six contact pins 2 are arranged in the regular hexagon. One end of the at least six contact pins 2 can be located inside the annular fixing member 7. When the direction is sensed, the moving member 3 contacts with the at least six contact pins 2 located inside the annular fixing member 7. When the direction sensor 100 is placed horizontally, an angle between the at least six contact pins 2 and a horizontal plane can be 0 degree, or the angle between the at least six contact pins 2 and a horizontal plane can be greater than 0 degree and less than 90 degrees.

In the present disclosure, the two electrode guides 1, 1' can also be connected to the annular fixing member 7, respectively. That is, the two electrode guides 1, 1' are fixed on annular fixing member 7. There are many methods for fixing the two electrode guides 1, 1' on the annular fixing member 7. One method is fixing one of the electrode guides 1, 1' on the annular fixing member 7, and another method is fixing one of the electrode guides 1, 1' on one end of the annular fixing member 7.

In the present disclosure, the main function of the annular fixing member 7 is for fixing the at least six contact pins 2. Therefore, the position limiting structure connected to the contact pin 2 can be replaced by the annular fixing member 7 in other embodiments of the present disclosure, but other examples will not be illustrated here one by one.

Figure 7:
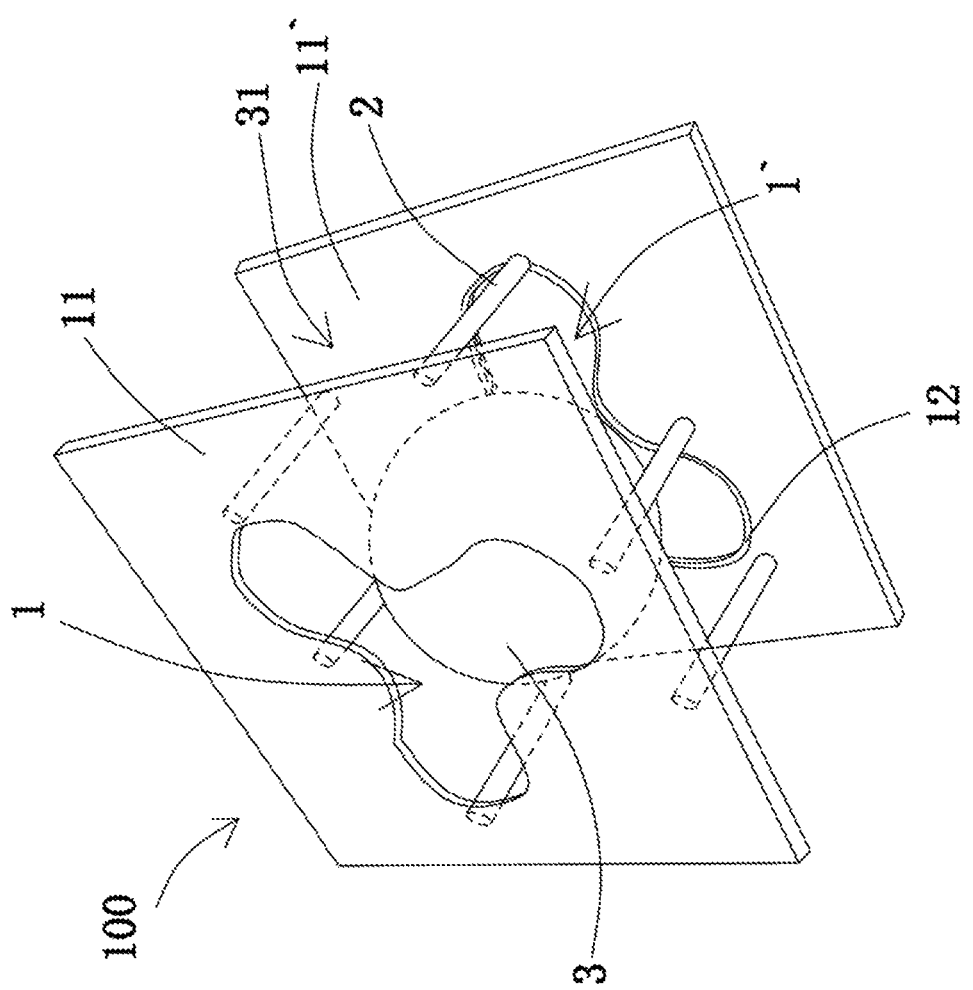
FIG. 7 is a three-dimensional view according to second embodiment of the present disclosure.

Please refer to FIG. 7, FIG. 7 is a three-dimensional view according to second embodiment of the present disclosure, wherein the second embodiment is an improvement based on the first embodiment of FIG. 1 or the first embodiment of FIG. 5. The working principle of the embodiment of FIG. 7 is same as that shown in the embodiments of FIGS. 1 and 5 except that the structure is partially different. In particular, the structures of the two electrode guides 1, 1' are modified. Therefore, the same or corresponding components are represented as the same or corresponding reference numerals. The details please refer to the explanation above, and the same structures and principles are not illustrated any further here. The differences of the structure are as follows. In this embodiment, the two electrode guides 1, 1' are the two through holes with the irregular geometric shape in cross section. Regardless of the shape of the two through holes, the two through holes with the irregular geometric shape guide the moving member 3 when the direction is sensed, so that the moving member 3 can contact with the lowest contact pin 2 of the at least six contact pins 2 in current state. In addition, the two metal electrodes 12 are disposed on the surfaces close to the two through holes, respectively, the two metal electrodes 12 are located on the opposite surfaces of the two position limiting structure 11, 11', and/or the two metal electrodes 12 are disposed on inner walls of the two through holes, respectively. The shapes of the two metal electrodes 12 can be the same as the cross-sectional shapes of the through holes, that is, the shapes of the two metal electrodes 12 are the irregular geometric shapes. Or, the shapes of the two metal electrodes 12 can be different from the cross-sectional shapes of the through holes, that is, the shapes of the two metal electrodes 12 are not the irregular geometric shapes. The shapes of the two metal electrodes 12 can be selected according to the actual situation and will not be described in detail here.

Figure 8:
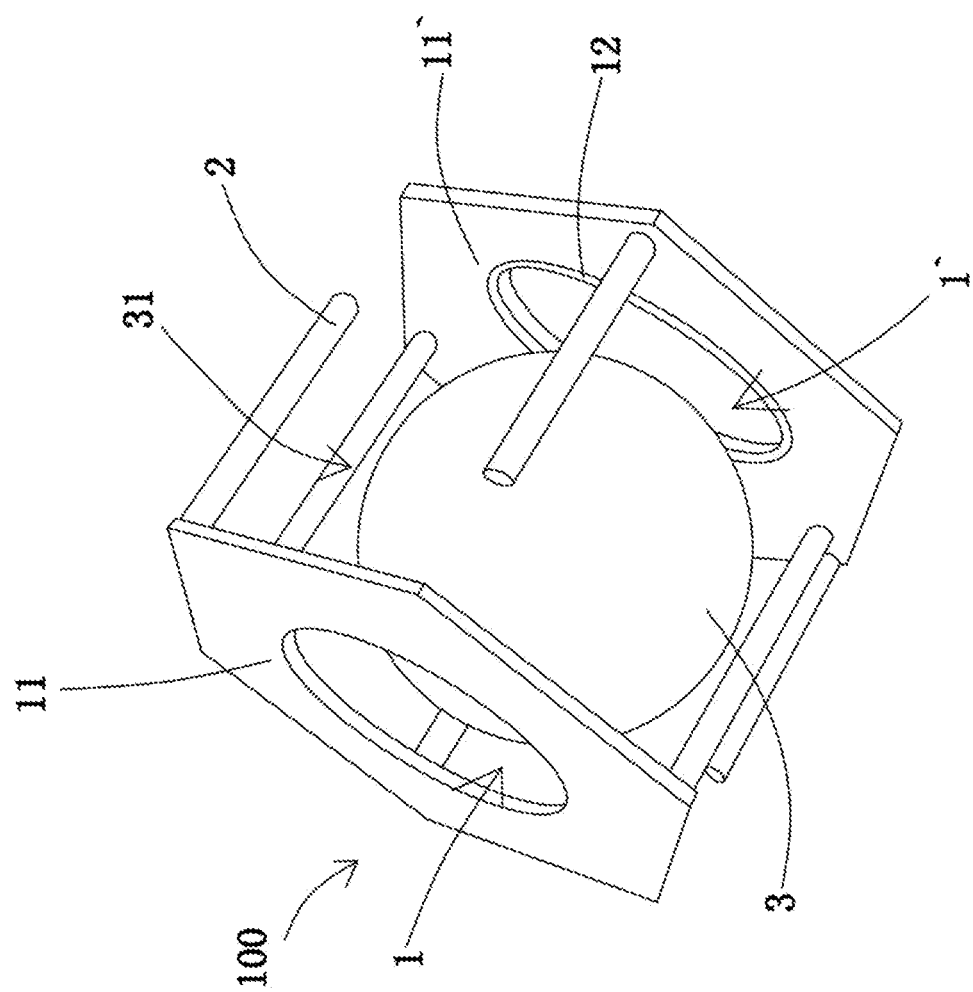
FIG. 8 is a three-dimensional view according to third embodiment of the present disclosure.

Please refer to FIG. 8, FIG. 8 is a three-dimensional view according to third embodiment of the present disclosure, wherein the third embodiment is the improvement based on the first embodiment of FIG. 1 or the first embodiment of FIG. 5. The working principle of the embodiment of FIG. 8 is same as that shown in the embodiments of FIGS. 1 and 5 except that the structure is partially different. In particular, the structures of the two electrode guides 1, 1' are modified. Therefore, the same or corresponding components are represented as the same or corresponding reference numerals. The details please refer to the explanation above, and the same structures and principles are not illustrated any further here. The differences of the structure are as follows. In this embodiment, the shapes of the two position limiting structure 11, 11' can be hexagons. The shapes of the two position limiting structure 11, 11' are not limited to hexagons, the shapes of the two position limiting structure 11, 11' can be other shapes, such ad the geometric shapes or the irregular non-geometric shape. Other examples will not illustrate here one by one.

In this embodiment, the two electrode guides 1, 1' can be two circular through holes. When the direction is sensed, the two circular through holes guide the moving member 3, so that the moving member 3 can contact with the lowest contact pin 2 of the at least six contact pins 2 in current state. In addition, the two metal electrodes 12 are disposed on the surfaces close to the two through holes, respectively, the two metal electrodes 12 are located on the opposite surfaces of the two position limiting structure 11, 11'; and/or the two metal electrodes 12 are disposed on the inner walls of the through holes, respectively. The shapes of the two metal electrodes 12 can be the same as the cross-sectional shapes of the through holes, that is, the shapes of the two metal electrodes 12 are circles. Or, the shapes of the two metal electrodes 12 can be different from the cross-sectional shapes of the through holes, that is, the shapes of the two metal electrodes 12 are not the circles. The shapes of the two metal electrodes 12 can be selected according to the actual situation and will not be described in detail here.

Figure 9:
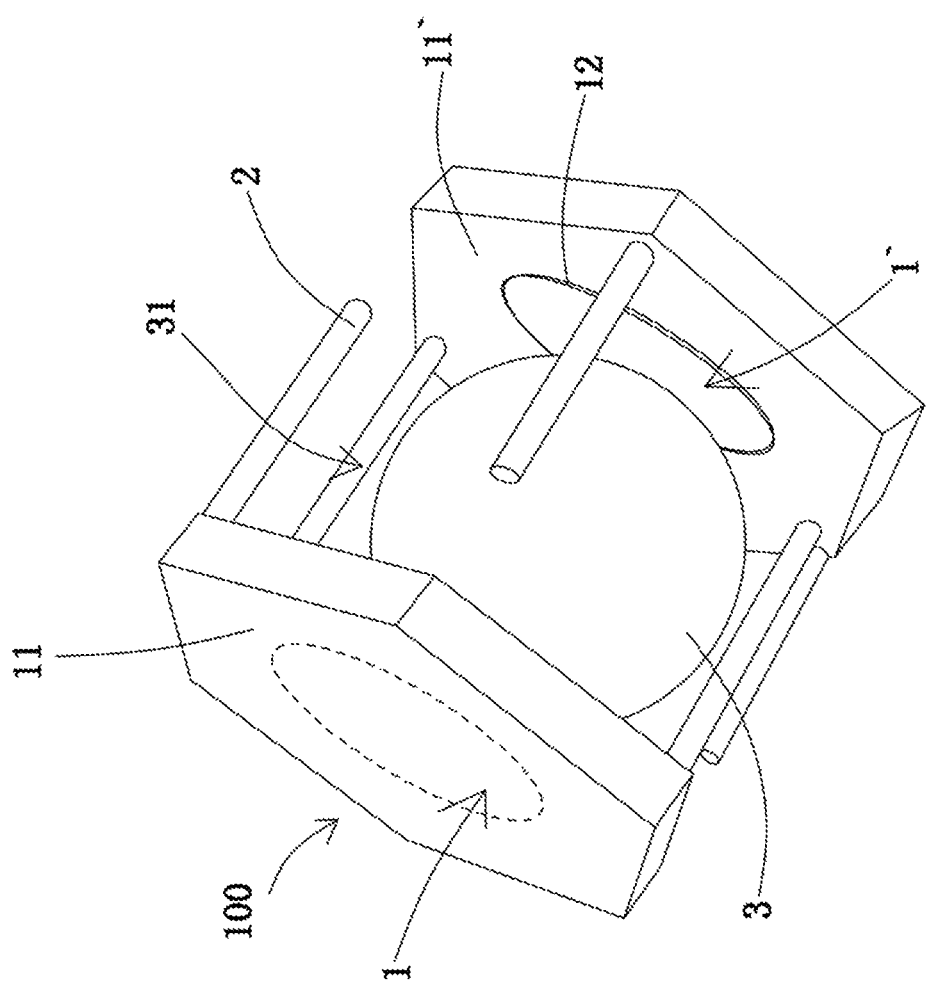
FIG. 9 is a three-dimensional view according to fourth embodiment of the present disclosure.

Please refer to FIG. 9, FIG. 9 is a three-dimensional view according to fourth embodiment of the present disclosure, wherein the fourth embodiment is the improvement based on the first embodiment of FIG. 1 or the third embodiment of FIG. 8. The working principle of the embodiment of FIG. 9 is same as that shown in the embodiments of FIGS. 1 and 8 except that the structure is partially different. In particular, the structures of the two electrode guides 1, 1' are modified. Therefore, the same or corresponding components are represented as the same or corresponding reference numerals. The details please refer to the explanation above, and the same structures and principles are not illustrated any further here. The differences of the structure are as follows. In this embodiment, the two electrode guides 1, 1' can be two recesses, that is, the two recesses are disposed on the two position limiting structure 11, 11'. The two recesses are located on the opposite surfaces of the two position limiting structure 11, 11'. Regardless of the shape of the recesses, the two recesses guide the moving member 3 when the direction is sensed, so that the moving member 3 can contact with the lowest contact pin 2 of the at least six contact pins 2 in current state. In addition, the two metal electrodes 12 are disposed on the surfaces at the openings of the two recesses, respectively, the two metal electrodes 12 are located on the opposite surfaces of the two position limiting structure 11, 11'; and/or the two metal electrodes 12 are disposed on inner walls of the two recesses, respectively. The shapes of the two metal electrodes 12 can be the same as the cross-sectional shapes of the recesses, or the shapes of the two metal electrodes 12 can be different from the cross-sectional shapes of the recesses. The shapes of the two metal electrodes 12 can be selected according to the actual situation and will not be described in detail here.

In the present disclosure, the cross-sectional shapes of the two recesses can be the geometric shapes, such as the circles, the ellipses, the triangles, the pentagons, the hexagons, or the heptagons.

Figure 10:
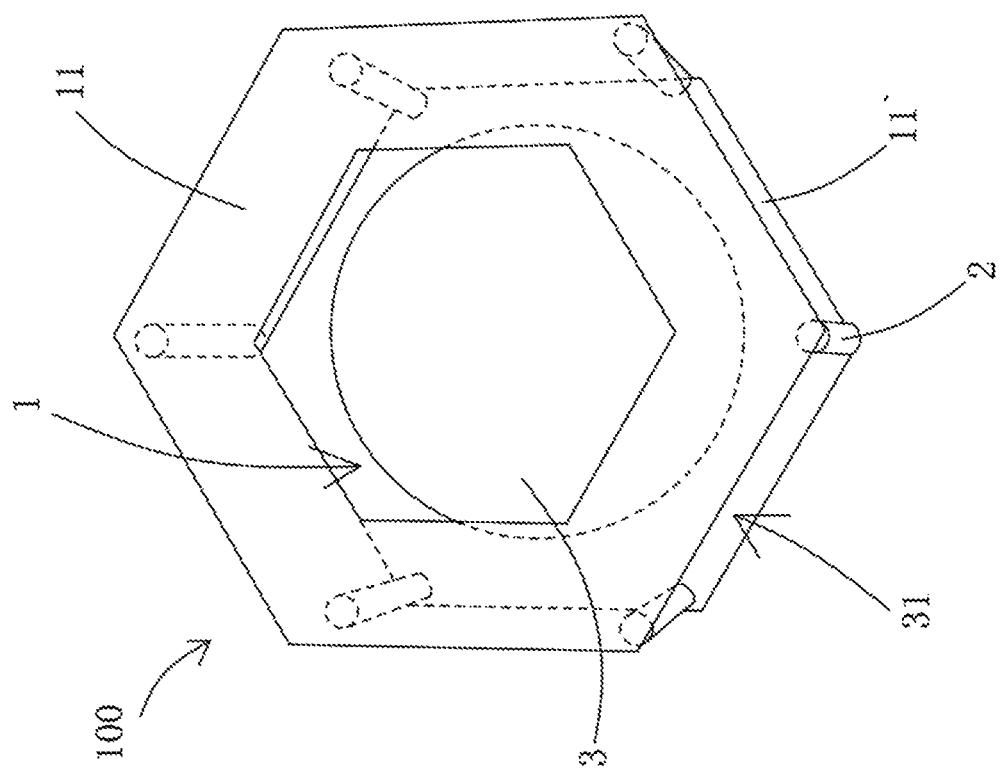
FIG. 10 is a top structural view according to fifth embodiment of the present disclosure.
Figure 11:
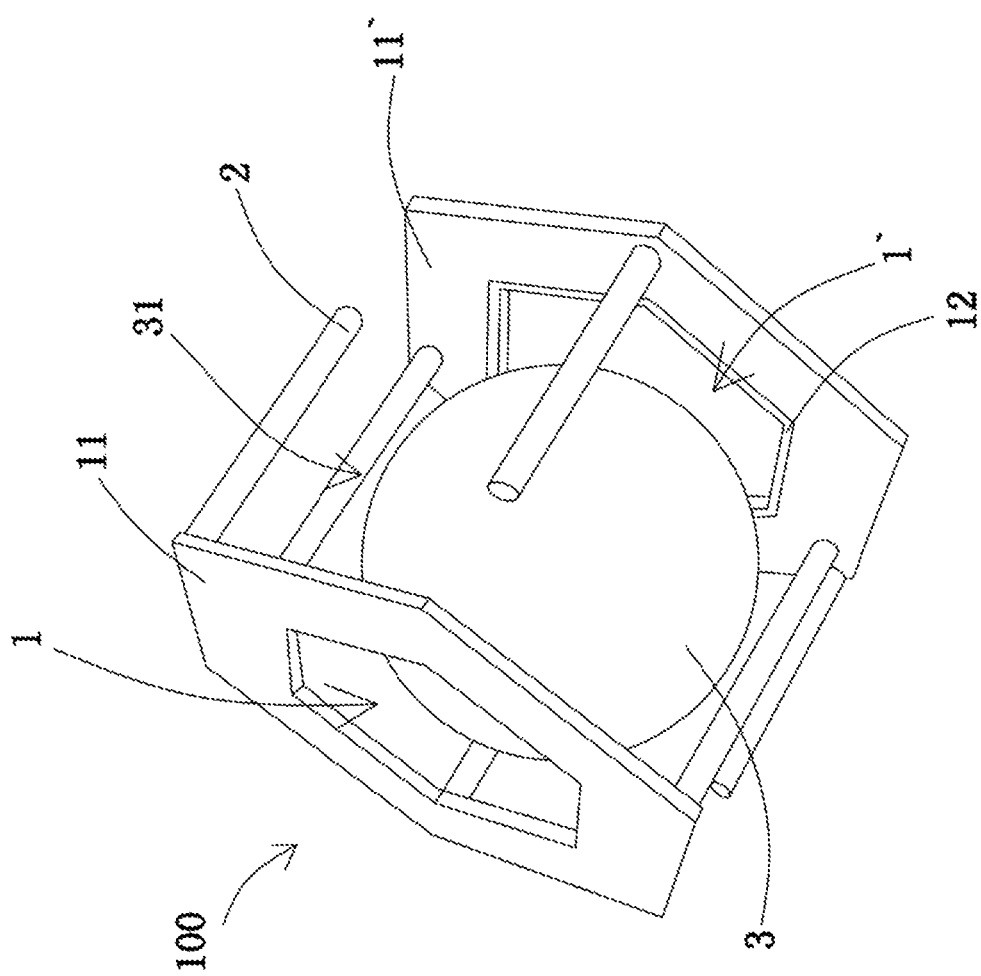
FIG. 11 is a three-dimensional view of the fifth embodiment of FIG. 10.

Please refer to FIGS. 10 and 11, FIG. 10 is a top structural view according to fifth embodiment of the present disclosure and FIG. 11 is a three-dimensional view of the fifth embodiment of FIG. 10, wherein the fifth embodiment is the improvement based on the first embodiment of FIG. 1 or the third embodiment of FIG. 8. The working principle of the embodiment of FIGS. 10 and 11 is same as that shown in the embodiments of FIGS. 1 and 8 except that the structure is partially different. In particular, the structures of the two electrode guides 1, 1' are modified. Therefore, the same or corresponding components are represented as the same or corresponding reference numerals. The details please refer to the explanation above, and the same structures and principles are not illustrated any further here. The differences of the structure are as follows. In this embodiment, the two electrode guides 1, 1' are two through holes with the hexagons in cross section, wherein the hexagons can be the regular hexagons or non-hexagons. Regardless of the shape of the two through holes, the two through holes with the hexagons guide the moving member 3 when the direction is sensed, so that the moving member 3 can contact with the lowest contact pin 2 of the at least six contact pins 2 in current state. In addition, the two metal electrodes 12 are disposed on the surfaces close to the two through holes, respectively, the two metal electrodes 12 are located on the opposite surfaces of the two position limiting structure 11, 11', and/or the two metal electrodes 12 are disposed on the inner walls of the two through holes, respectively. The shapes of the two metal electrodes 12 can be the same as the cross-sectional shapes of the through holes, that is, the shapes of the two metal electrodes 12 are the hexagons. Or, the shapes of the two metal electrodes 12 can be different from the cross-sectional shapes of the through holes, that is, the shapes of the two metal electrodes 12 are not the hexagons. The shapes of the two metal electrodes 12 can be selected according to the actual situation and will not be described in detail here.

Figure 12:
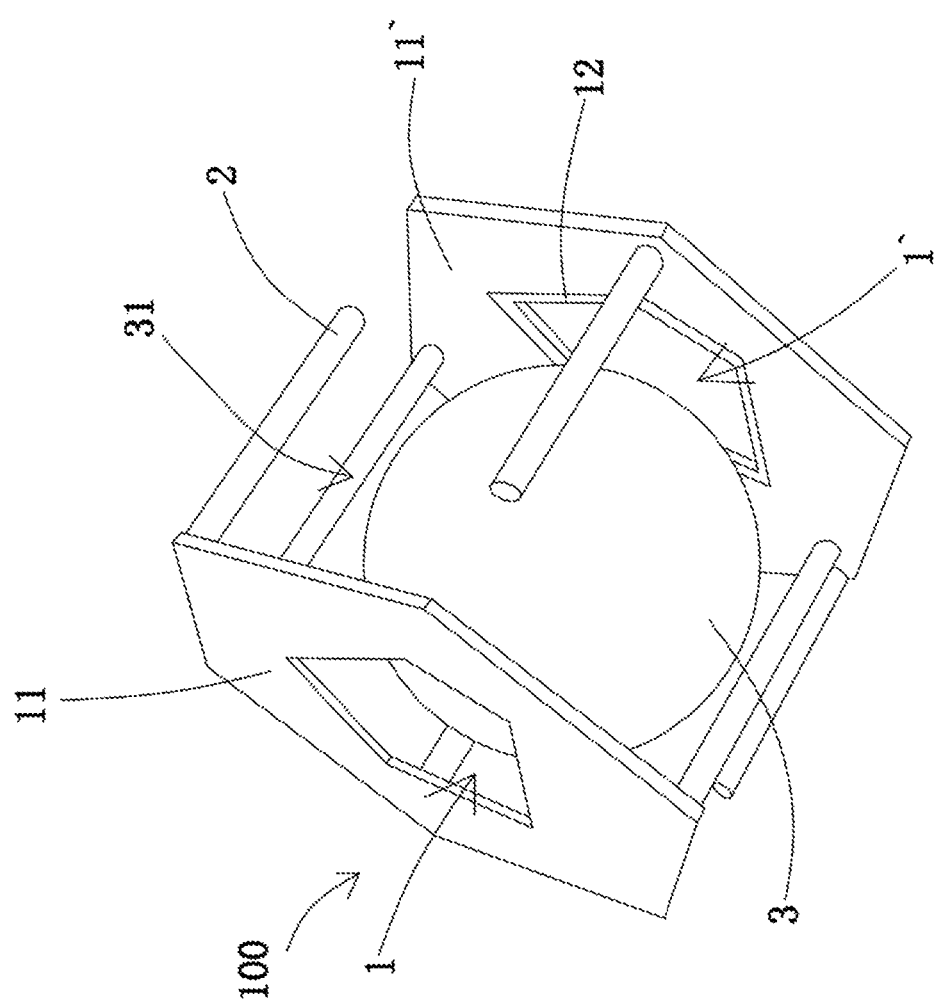
FIG. 12 is a three-dimensional view according to sixth embodiment of the present disclosure.
Figure 13:
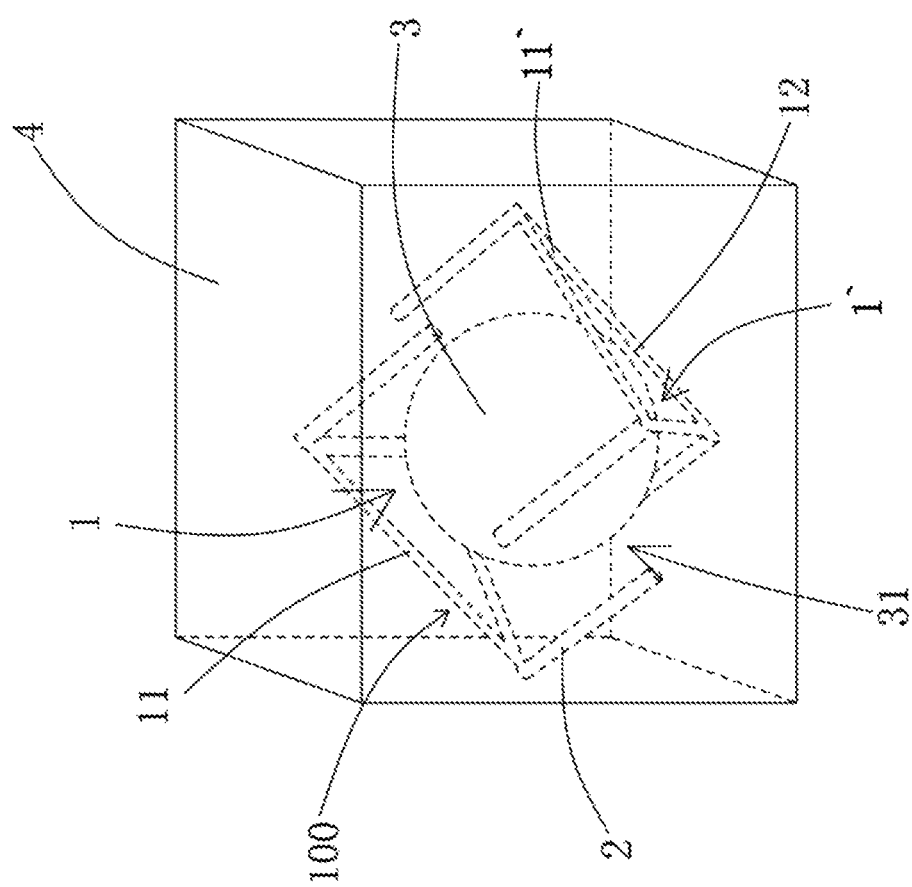
FIG. 13 is an operating three-dimensional view of the first embodiment of FIG. 3.

Please refer to FIG. 12, FIG. 12 is a three-dimensional view according to sixth embodiment of the present disclosure, wherein the sixth embodiment is the improvement based on the first embodiment of FIG. 1 or the third embodiment of FIG. 8. The working principle of the embodiment of FIG. 12 is same as that shown in the embodiments of FIGS. 1 and 8 except that the structure is partially different. In particular, the structures of the two electrode guides 1, 1' are modified. Therefore, the same or corresponding components are represented as the same or corresponding reference numerals. The details please refer to the explanation above, and the same structures and principles are not illustrated any further here. The differences of the structure are as follows. In this embodiment, the two electrode guides 1, 1' can be two through holes with the pentagons in cross section, wherein the pentagons can be regular pentagons or non-pentagons. Regardless of the shape of the two through holes, the two through holes with the pentagons guide the moving member 3 when the direction is sensed, so that the moving member 3 can contact with the lowest contact pin 2 of the at least six contact pins 2 in current state. In addition, the two metal electrodes 12 are disposed on the surfaces close to the two through holes, respectively, the two metal electrodes 12 are located on the opposite surfaces of the two position limiting structure 11, 11', and/or the two metal electrodes 12 are disposed on the inner walls of the two through holes, respectively. The shapes of the two metal electrodes 12 can be the same as the cross-sectional shapes of the through holes, that is, the shapes of the two metal electrodes 12 are the pentagons. Or, the shapes of the two metal electrodes 12 can be different from the cross-sectional shapes of the through holes, that is, the shapes of the two metal electrodes 12 are not the pentagons. The shapes of the two metal electrodes 12 can selected according to the actual situation and will not be described in detail here Please refer to FIG. 13, FIG. 13 is an operating three-dimensional view of the first embodiment of FIG. 3. The structure of the direction sensor 100 of FIG. 13 is the same as that of the direction sensor 100 of FIG. 3. The working principle of the direction sensor 100 also will not be illustrated any further here. For details, please refer to FIG. 1 and the description of FIG. 1. This embodiment is only an application of the present disclosure. This embodiment can further include a first hexahedron 4. The direction sensor 100 is disposed obliquely inside the first hexahedron 4 for sensing six surfaces of the first hexahedron 4 and determining whether the first hexahedron 4 is flipped. In particular, the direction sensor 100 can only be used to sense the top of the first hexahedron 4. That is, when any one surface of the first hexahedron 4 is located above, the contact pin 2 corresponding to the sensed direction (surface) will be located below. Accordingly, the moving member 3 will be guided downwards by one of the two electrode guides 1, 1' and contact with the contact pin 2 located below under the gravity action, so as to sense above direction of the first hexahedron 4.

In this embodiment, the first hexahedron 4 is one of the embodiments, and the application of the present disclosure is not limited thereto. The first hexahedron 4 also can be a vase, an elderly, a child, an automobile, a container or a glass Instead. That is, the direction sensor 100 can be mounted on the vase, the elderly, the child, the automobile, the container or the glass, so that the direction sensor 100 can be used to sense whether the vase, the elderly, the child, the car, the container or the glass is flipped and the flip direction. But how to use the direction sensor 100 to sense the flip direction of the vase, the elderly, the child, the car, the container or the glass will not describe here. It should be noted that, in this embodiment, the direction sensor 100 can use any embodiments of the direction sensor 100 of the present disclosure.

Figure 14:
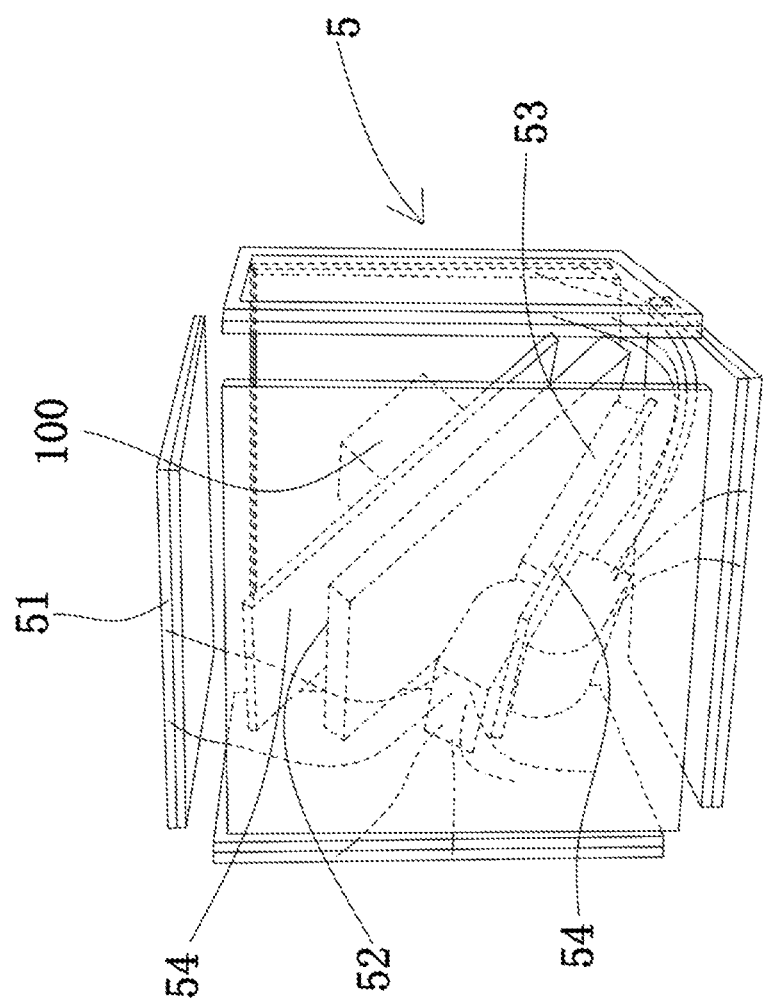
FIG. 14 is an operating three-dimensional view according to one embodiment of the present disclosure.

Please refer to FIG. 14, FIG. 14 is an operating three-dimensional view according to one embodiment of the present disclosure. The embodiment includes a second hexahedron 5, the direction sensor 100, solar cell panels 51, a solar converter circuit 52, an energy storage module 53, a fixing plate 54 and a wireless communication module (not shown). The solar cell panels 51 are disposed on the six surfaces of the second hexahedron 5, and the direction sensor 100, the solar converter circuit 52, the energy storage module 53, the fixing plate 54, and the wireless communication module are disposed inside the second hexahedron 5. The direction sensor 100, the solar converter circuit 52, the energy storage module 53 and the wireless communication module are disposed on the fixing plate 54, respectively. The fixing plate 54 can be the PCB or a fixing plate of other structures, which will not be illustrated here one by one.

In this embodiment, the solar cell panels 51 are electrically connected to the solar converter circuit 52, and the solar converter circuit 52 is electrically connected to the energy storage module 53. The energy storage module 53 provides electrical energy to the direction sensor 100 and the wireless communication module, and the direction sensor 100 is electrically connected to the wireless communication module.

In this embodiment, the energy storage module 53 can be a rechargeable battery, such as a rechargeable lithium battery. But the energy storage module 53 is not limited to the rechargeable lithium battery herein, it can be a rechargeable battery with other structures. The wireless communication module can a LoRa communication module, a WIFI communication module, a Bluetooth communication module, a Zigbee communication module, a 2.4G communication module, a 5.8G communication module, a 3G communication module and/or a 4G communication module.

In this embodiment, the solar cell panels 51 convert solar energy into electrical energy, and the solar converter circuit 52 rectifies the converted electrical energy to make it possible to charge the energy storage module 53. When the direction sensor 100 senses the flip direction, the direction sensor 100 transmits the sensed direction signal to the wireless communication module, and the wireless communication module sends the sensed direction signal to an external device. Therefore, people can know the flip direction of the second hexahedron 5 by the external device. It should be noted that the above explanation is only an example for a better understanding of the present disclosure, and the application of the present disclosure is not limited thereto.

The direction sensor of the present disclosure includes the two electrode guides, the at least six contact pins, the moving member and the signal processing circuit. When the direction is sensed, the electrode guide corresponding to the sensed direction below guides the movement direction of the moving member according the sensed direction, so that the moving member contacts with the contact pin corresponding to the sensed direction below. Accordingly, the electrode guide, the moving member and the contact pin corresponding to the sensed direction below form the sensing signal loop, and the signal processing circuit detects the flip direction of the sensed object according to the sensed signal, wherein the direction sensor of the present disclosure can sense the six directions of the sensed object. Therefore, the direction sensor of the present disclosure has the advantages of simple structure, six directions detectability and sensing accuracy.

Although the present disclosure has been described in considerable detail with reference to certain embodiments thereof, other embodiments are possible. Therefore, the spirit and scope of the appended claims should not be limited to the description of the embodiments contained herein.

It will be apparent to those skilled in the art that various modifications and variations can be made to the structure of the present disclosure without departing from the scope or spirit of the disclosure. In view of the foregoing, it is intended that the present disclosure cover modifications and variations of this disclosure provided they fall within the scope of the following claims.

What is claimed is:
1. A direction sensor, comprising:
two electrode guides, wherein the two electrode guides are formed with a gap;
at least six contact pins, wherein the two electrode guides and the at least six contact pins define a space;
a moving member, wherein the moving member is restricted to move in the space; and
a signal processing circuit, wherein the two electrode guides are electrically connected to one signal terminal of the signal processing circuit, respectively, and the at least six contact pins are electrically connected to another signal terminal of the signal processing circuit, respectively,
wherein a direction is sensed after the moving member moves in the space according to a sensed direction and contacts with the contact pin corresponding to the sensed direction below, so that one of the electrode guides and the contact pin corresponding to the sensed direction below form a sensing signal loop through the moving member.
2. The direction sensor of claim 1, wherein the at least six contact pins respectively correspond to six sensed directions, and the at least six contact pins are arranged in an annular shape.

3. The direction sensor of claim 1, wherein the two electrode guides form recesses, through holes, frames, or a combination of any two.

4. The direction sensor of claim 3, wherein cross-sectional shapes of the two electrode guides are triangles, the two triangles rotate relative to each other by a predetermined angle, and a range of the predetermined angle is greater than or equal to 150 degrees and less than or equal to 210 degrees.

5. The direction sensor of claim 1, wherein cross-sectional shapes of the two electrode guides are geometric shapes or irregular geometric shapes, the geometric shapes are circles, pentagons, hexagons or heptagons, and a diameter of an incircle of the two electrode guides is smaller than a minimum diameter of the moving member.

6. The direction sensor of claim 1, wherein the moving member is spherical, and the at least six contact pins are disposed between the two electrode guides.

7. The direction sensor of claim 1, further comprising at least one position limiting structure, and at least one of the two electrode guides is disposed on the position limiting structure.

8. The direction sensor of claim 7, wherein a number of the position limiting structure is two, the at least six contact pins are disposed between the two the position limiting structures, and the at least six contact pins are connected to at least one position limiting structure.

9. The direction sensor of claim 1, wherein the two electrode guides are electrically connected to a signal output terminal of the signal processing circuit, respectively; and the at least six contact pins are respectively electrically connected to a signal input terminal of the signal processing circuit.

10. A direction sensor, comprising:
two electrode guides, wherein the two electrode guides are formed with a gap;
at least five contact pins and a restricting member, wherein the two electrode guides, the at least five contact pins and the restricting member define a space;
a moving member, wherein the moving member is restricted to move in the space; and
a signal processing circuit, wherein the two electrode guides are electrically connected to one signal terminal of the signal processing circuit, respectively, the at least five contact pins are electrically connected to another signal terminal of the signal processing circuit, respectively, and the restricting member is not electrically connected to the signal processing circuit,
wherein a direction is sensed after the moving member moves in the space according to a sensed direction and contacts with the contact pin corresponding to the sensed direction below, so that one of the electrode guides and the contact pin corresponding to the sensed direction below fonn a sensing signal loop through the moving member,
wherein the at least five contact pins and the restricting member respectively correspond to six sensed directions, and the at least five contact pins and the restricting member are arranged in an annular shape.

* * * * *